United States Patent
Grimmer et al.

(10) Patent No.: US 10,077,872 B2
(45) Date of Patent: Sep. 18, 2018

(54) COMPRESSED GAS FILLING METHOD AND SYSTEM

(71) Applicant: Gilbarco Inc., Greensboro, NC (US)

(72) Inventors: Andy Grimmer, Fitchburg, WI (US); Ronald Cloyd, Roscoe, IL (US); Ryan Salberg, Rockford, IL (US); Steve Zepp, Roscoe, IL (US)

(73) Assignee: Gilbarco Inc., Greensboro, NC (US)

( * ) Notice: Subject to any disclaimer, the term of this patent is extended or adjusted under 35 U.S.C. 154(b) by 182 days.

(21) Appl. No.: 15/143,531

(22) Filed: Apr. 30, 2016

(65) Prior Publication Data

US 2016/0245459 A1     Aug. 25, 2016

Related U.S. Application Data

(63) Continuation-in-part of application No. 14/929,901, filed on Nov. 2, 2015.

(Continued)

(51) Int. Cl.
    *B65B 31/00*     (2006.01)
    *F17C 5/06*     (2006.01)
    (Continued)

(52) U.S. Cl.
    CPC ............... *F17C 5/06* (2013.01); *F17C 5/007* (2013.01); *F17C 13/04* (2013.01); *F17C 2205/0142* (2013.01); *F17C 2205/0326* (2013.01); *F17C 2221/012* (2013.01); *F17C 2221/033* (2013.01); *F17C 2223/0123* (2013.01);
(Continued)

(58) Field of Classification Search
CPC .... F17C 5/06; F17C 13/04; F17C 2227/0337; F17C 2250/0439; F17C 2250/043; F17C 2270/0168; F17C 2250/07; F17C 2225/0123; F17C 2221/012; F17C 2223/0123; F17C 2250/0443; F17C 2227/04
See application file for complete search history.

(56) References Cited

U.S. PATENT DOCUMENTS 5,238,030 A    8/1993   Miller et al.
5,259,424 A    11/1993   Miller et al.
(Continued)

OTHER PUBLICATIONS

International Search Report and Written Opinion dated Jul. 13, 2017, received in corresponding application No. PCT/US2017/030400.
(Continued)

*Primary Examiner* — Jason K Niesz
(74) *Attorney, Agent, or Firm* — Nelson Mullins Riley & Scarborough, LLP

(57) ABSTRACT

Systems and methods for completely filling a storage vessel with a fuel gas. One method includes flowing the fuel gas along a fluid conduit in fluid communication with the storage vessel and actuating a valve disposed along the fluid conduit to provide a predetermined difference between the pressure of the fuel gas upstream of the valve and the pressure of the fuel gas downstream of the control valve. The predetermined difference is selected such that the temperature of the fuel gas is reduced to a predetermined temperature after passing through the valve. The method further includes dispensing the fuel gas into the storage vessel at a first mass flow rate.

18 Claims, 7 Drawing Sheets

Related U.S. Application Data

(60) Provisional application No. 62/074,138, filed on Nov. 3, 2014.

(51) Int. Cl.
    *F17C 13/04* (2006.01)
    *F17C 5/00* (2006.01)

(52) U.S. Cl.
    CPC .......... *F17C 2223/0153* (2013.01); *F17C 2223/033* (2013.01); *F17C 2225/0123* (2013.01); *F17C 2225/036* (2013.01); *F17C 2227/0157* (2013.01); *F17C 2227/036* (2013.01); *F17C 2227/043* (2013.01); *F17C 2250/032* (2013.01); *F17C 2250/043* (2013.01); *F17C 2250/0439* (2013.01); *F17C 2250/0443* (2013.01); *F17C 2250/0626* (2013.01); *F17C 2250/0631* (2013.01); *F17C 2260/021* (2013.01); *F17C 2260/023* (2013.01); *F17C 2265/065* (2013.01); *F17C 2270/0139* (2013.01); *Y02E 60/321* (2013.01)

(56) References Cited

U.S. PATENT DOCUMENTS

| | | |
|---|---|---|
| 5,641,005 A | 6/1997 | Kountz et al. |
| 5,653,269 A | 8/1997 | Miller et al. |
| 5,752,552 A | 5/1998 | Kountz et al. |
| 5,771,946 A | 6/1998 | Kooy et al. |
| 5,771,947 A | 6/1998 | Kountz et al. |
| 5,771,948 A | 6/1998 | Kountz et al. |
| 5,810,058 A | 9/1998 | Kountz et al. |
| 5,868,176 A | 2/1999 | Barajas et al. |
| 5,881,779 A * | 3/1999 | Kountz .............. F17C 5/06 141/2 |
| 8,517,062 B2 | 8/2013 | Allidieres et al. |
| 8,733,590 B2 | 5/2014 | Bartlett et al. |
| 2011/0259469 A1 | 10/2011 | Harty et al. |
| 2014/0130901 A1 | 5/2014 | Moses et al. |
| 2014/0311642 A1 | 10/2014 | Nagayoshi |
| 2015/0059863 A1 | 3/2015 | Barbato et al. |
| 2015/0083273 A1 | 3/2015 | Thiessen |
| 2015/0107681 A1 | 4/2015 | Killeen et al. |
| 2015/0308621 A1 | 10/2015 | Mathison |

OTHER PUBLICATIONS

International Search Report and Written Opinion of the International Searching Authority for PCT Application No. PCT/US2015/058795.

Ronald J. Gulmi et al., Full Fill Algorithm for CNG—Presentation to Natural Gas Vehicle Technology Forum, Sep. 10, 2003.

\* cited by examiner

COMPRESSED GAS FILLING METHOD AND SYSTEM

PRIORITY CLAIM

This application is a continuation-in-part of U.S. application Ser. No. 14/929,901, titled "Compressed Gas Filling Method and System," filed Nov. 2, 2015, which claims the benefit of U.S. Provisional Application Ser. No. 62/074,138, titled "Compressed Gas Filling Method and System," filed Nov. 3, 2014. Both of the foregoing applications are hereby relied upon and incorporated herein by reference for all purposes.

BACKGROUND

The present invention relates generally to methods and systems for dispensing fuel gases, such as compressed natural gas (CNG), to a storage vessel on a vehicle. More specifically, embodiments of the present invention relate to systems and methods for ensuring that a fuel gas storage vessel is completely filled during dispensing, regardless of ambient temperature or the initial pressure of the storage vessel.

Those of skill in the art are familiar with dispensing systems for vehicles that are fueled by gas that is flowed into a cylinder or vessel, such as natural gas vehicles (NGVs). In general, NGV storage vessels are rated to be completely filled with gas under a given pressure at a given temperature (e.g., 3600 psi at 70° F.). The Ideal Gas Law defines a direct relationship between the temperature and pressure of a gas being added into a fixed-volume storage vessel, and thus as the temperature of the gas increases, greater pressures are required to completely fill the vessel. As the gas inside the vessel cools, the pressure inside the vessel decreases.

Most filling systems are configured to terminate when the dispenser measures a target pressure of the gas in the NGV storage vessel at which it is expected that the vessel should be completely filled. In the past, the target pressure has been based on the pressure at which the storage vessel is rated to be completely filled at the measured ambient temperature. In addition, as a safety measure, the filling system is typically configured to halt dispensing if the pressure in the vessel reaches a predetermined cutoff pressure. This cutoff pressure is typically greater than the target pressure but lower than the maximum pressure the vessel is designed to safely accommodate.

As is known, prior art dispensing systems for CNG, including those that compensate for differences in ambient temperature, often fail to completely fill, or "charge," the vessels, especially at higher ambient temperatures. In particular, during a "fast-fill" dispensing process (i.e., one that is typically designed to take fewer than five minutes), it is often the case that a pressure greater than the cutoff pressure is required to completely charge the NGV's storage vessel. As a result, the dispenser will terminate the filling process when the gas reaches the cutoff pressure, before the vessel is completely charged.

Those of skill in the art are familiar with a variety of prior art systems which attempt to solve the problem described above. Examples of such attempts include U.S. Pat. Nos. 5,259,424; 5,641,005; 5,653,269; 5,868,176; and 5,881,779, the disclosure of each of which is incorporated by reference herein in its entirety for all purposes. Unfortunately, however, prior art attempts have failed to solve this problem, and they cannot accurately determine when the storage vessel will be completely filled to its rated capacity, yet not overfilled.

SUMMARY

The present invention recognizes and addresses various considerations of prior art constructions and methods. According to one embodiment, the present invention provides a method of filling a storage vessel with a fuel gas in a fuel gas dispensing system, the fuel gas dispensing system comprising a fluid flow path operatively connected with a source of the fuel gas and configured for fluid communication with the storage vessel. The method comprises actuating a controlled valve disposed along the fluid flow path to a first position and flowing the fuel gas through the controlled valve in the first position. When the controlled valve is in the first position, the fuel gas has a first temperature upstream of the controlled valve, a second, lower temperature downstream of the controlled valve, and a first mass flow rate. The method also comprises dispensing a first mass of the fuel gas into the storage vessel when the controlled valve is in the first position; actuating the controlled valve to a second position; and flowing the fuel gas through the controlled valve in the second position. When the controlled valve is in the second position, the fuel gas has a second mass flow rate that is greater than the first mass flow rate. Finally, the method comprises dispensing a second mass of the fuel gas into the storage vessel when the controlled valve is in the second position.

In another embodiment, the present invention provides a method for filling a storage vessel with a fuel gas. The method includes flowing the fuel gas along a fluid conduit in fluid communication with the storage vessel and actuating a valve disposed along the fluid conduit to provide a predetermined difference between the pressure of the fuel gas upstream of the valve and the pressure of the fuel gas downstream of the control valve. The predetermined difference is selected such that the temperature of the fuel gas is reduced to a predetermined temperature after passing through the valve. The method further includes dispensing the fuel gas into the storage vessel at a first mass flow rate.

In yet another embodiment, the present invention provides a method of controlling dispensing of fuel gas into a storage vessel in a fuel gas dispensing system, the fuel gas dispensing system comprising a fluid flow path extending between a source of the fuel gas and the storage vessel. The method comprises receiving at a control system information representative of the ambient temperature at the storage vessel and information representative of the pressure of gas in the storage vessel; determining an amount of fuel gas needed to completely fill the storage vessel; enabling flow of the fuel gas along the fluid flow path; and actuating a controlled valve disposed along the fluid flow path to change the temperature of the fuel gas flowing in the fluid flow path. Further, the method comprises dispensing a first amount of the fuel gas into the storage vessel, the first amount of fuel gas having a first temperature; and dispensing a second amount of the fuel gas into the storage vessel, the second amount of fuel gas having a second temperature that is higher than the first temperature.

Those skilled in the art will appreciate the scope of the present invention and realize additional aspects thereof after reading the following detailed description of preferred embodiments in association with the accompanying drawing figures.

BRIEF DESCRIPTION OF THE DRAWINGS

A full and enabling disclosure of the present invention, including the best mode thereof directed to one skilled in the art, is set forth in the specification, which makes reference to the appended drawings, in which.

Figure 1:
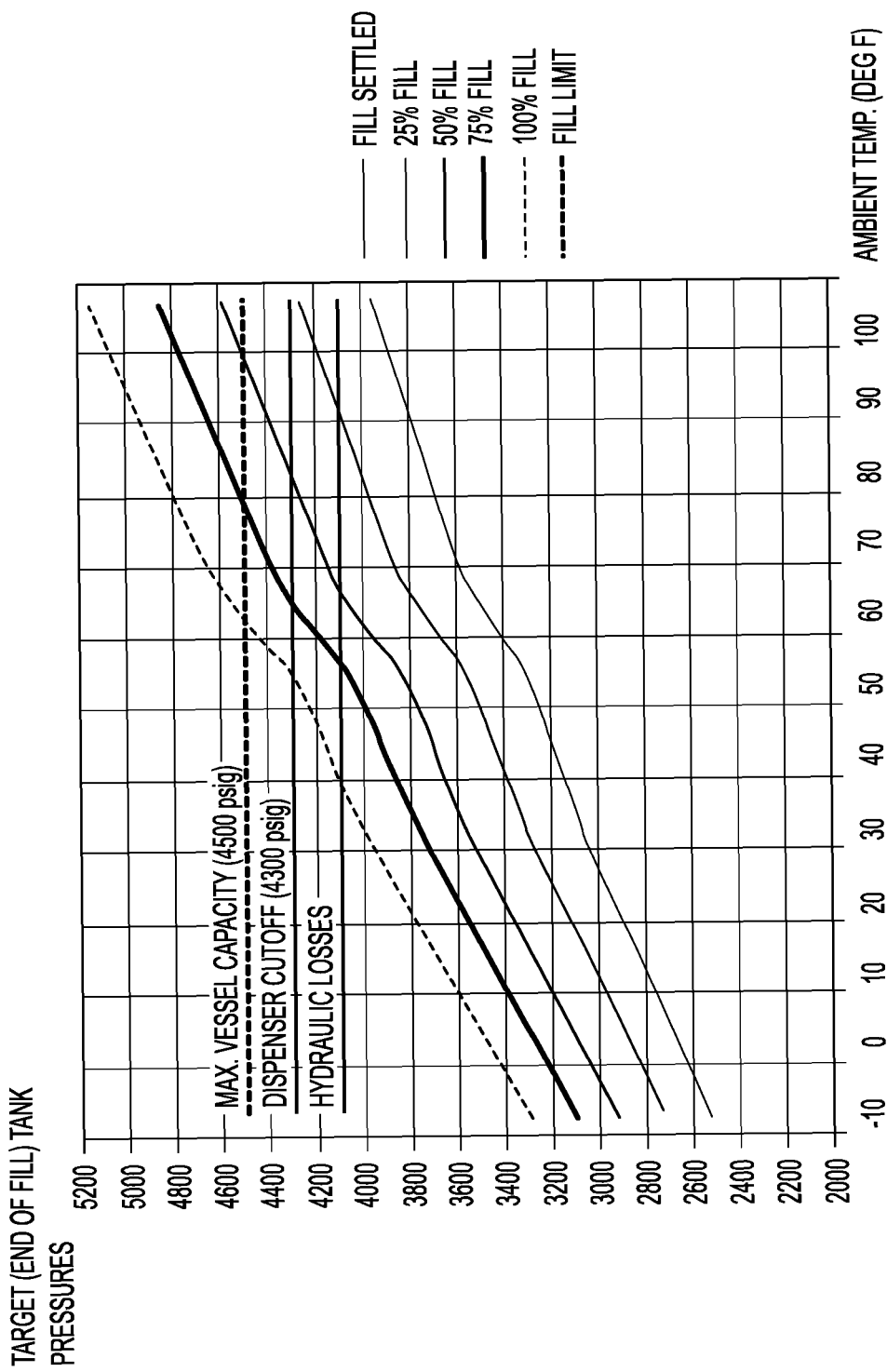
FIG. 1 is a chart of the pressure required to fill a storage vessel to 25%, 50%, 75%, and 100% as a function of the ambient temperature in a prior art CNG dispensing system.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the present disclosure including the appended claims and their equivalents.

Some embodiments of the present invention may be particularly suitable for use in dispensing natural gas, such as with a CNG dispenser in a retail service station environment, and the below discussion will describe some preferred embodiments in that context. However, those of skill in the art will understand that the present invention is not so limited. In fact, it is contemplated that embodiments of the present invention may be used with any compressible fluid medium having a gaseous end-state and with fluid dispensing equipment (such as nozzles and fluid dispensing hoses) associated with each such fluid medium. For example, embodiments of the present invention may also be used in dispensing of liquid natural gas (LNG), hydrogen, butane, and propane, among other fuel gases. Further, embodiments of the present invention may be used with any type of storage vessel and with any type of vehicle.

Finally, although certain components that may be used in the practice of embodiments of the present invention, such as valves, valve controllers, temperature sensors, pressure sensors, and control systems, are described in one embodiment as internal to the housing a CNG dispenser, those of skill in the art will appreciate that, in other embodiments, these components may also be implemented at other locations within the CNG dispensing system. For example, these components may be located at the compressor stage or associated with a priority panel, among other locations.

As noted above, prior art CNG dispensing systems often fail to completely charge a storage vessel. This underfilling is the result of a number of complex fluid dynamic and thermodynamic processes. Primary among these is that, during fast-filling, the gas in the storage vessel is compressed (or rather, recompressed) at a rapid rate, which in turn causes increases in gas temperature. This contributes to the result that pressures higher than those estimated based on ambient temperature (and, as explained below, in some cases higher than the dispenser cutoff pressure) are required to completely fill the vessel. In addition to the ambient temperature and the heat of compression, other factors can affect the ability of a dispenser to completely fill a vessel, including the initial vessel and supply gas pressures and the supply gas temperature. Further, hydraulic losses in the filling circuit, which may be as much as or more than 200 psi, and other dynamic fill conditions at the dispenser may reduce the maximum obtainable tank pressure. Moreover, if the mass flow rate of the fuel gas becomes too high, backpressures can develop upstream of the fueling nozzle and trigger opening of a safety relief valve. Depending on the ambient temperature, initial pressure in the storage vessel, and various characteristics of the dispensing system, the storage vessels may be left underfilled by as much as 20%.

In this regard, FIG. 1 is a chart of the pressure required to fill a storage vessel to 25%, 50%, 75%, and 100% as a function of the ambient temperature. Horizontal lines on the chart ("Fill limits") represent exemplary pressures corresponding to the maximum capacity of a storage vessel (4500 psig), dispenser cutoff (4300 psig), and the pressure obtainable as a result of hydraulic losses (4100 psig). The line labeled "Fill Settled" on the chart represents the "settled" pressure, or the pressure inside the vessel when the temperature inside the vessel has cooled to the ambient temperature, at a given ambient temperature. As shown, for example, at ambient temperatures above about 40° F., the dispensing system is prevented from applying the pressure required to completely fill the storage vessel.

Figure 2:
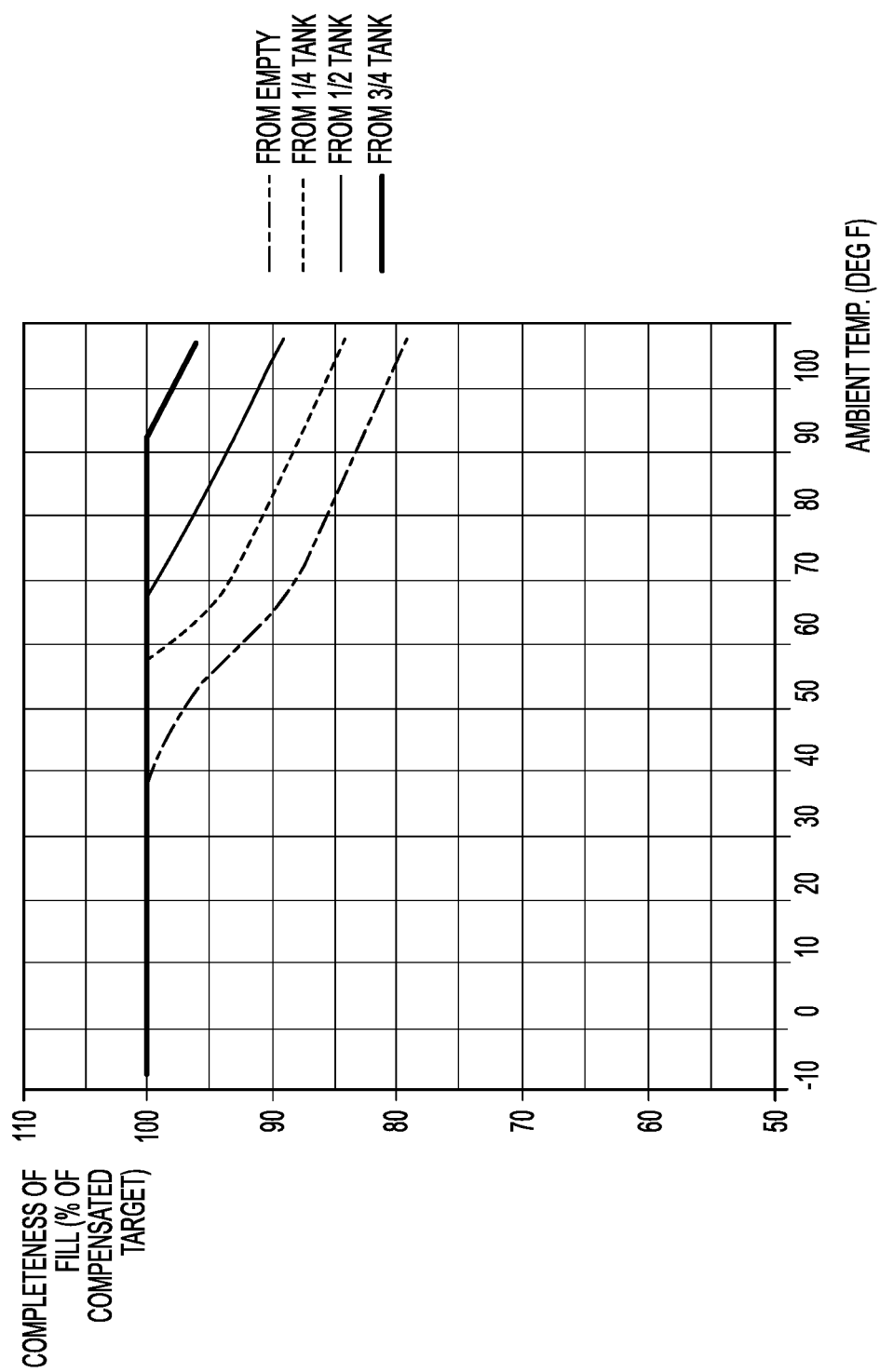
FIG. 2 is a chart of the completeness of fill, expressed as a percentage of the compensated target pressure, as a function of the ambient temperature in a prior art CNG dispensing system.

FIG. 2 is a chart of the completeness of fill, expressed as a percentage of the compensated target pressure, as a function of the ambient temperature. The chart includes lines representing the completeness of fill for fills beginning with an empty storage vessel, with a quarter filled storage vessel, with a half-filled storage vessel, and with a three-quarters-filled storage vessel. It will be appreciated from FIG. 2 that a complete charge of a storage vessel is possible at higher ambient temperatures (at least at those below about 90° F.) only where the filling process starts with a storage vessel that is already three-quarters filled. In contrast, where the filling process starts with a storage vessel that is empty, a complete charge is possible only at much lower ambient temperatures (e.g., up to approximately 40° F.).

Thus, prior art CNG dispensing systems have failed to adequately address the problem of underfilling of vehicle storage vessels. In contrast, embodiments of the present invention provide systems and methods for ensuring that a fuel gas storage vessel is completely filled during dispensing, regardless of ambient temperature or the initial pressure of the storage vessel. As described in more detail below, some embodiments may employ a multi-stage process comprising, in one stage, using a control valve to modulate the temperature of the gas to be dispensed and the temperature inside the vessel to compensate for the increase in gas temperature in the storage vessel as a result of compression.

Figure 3:
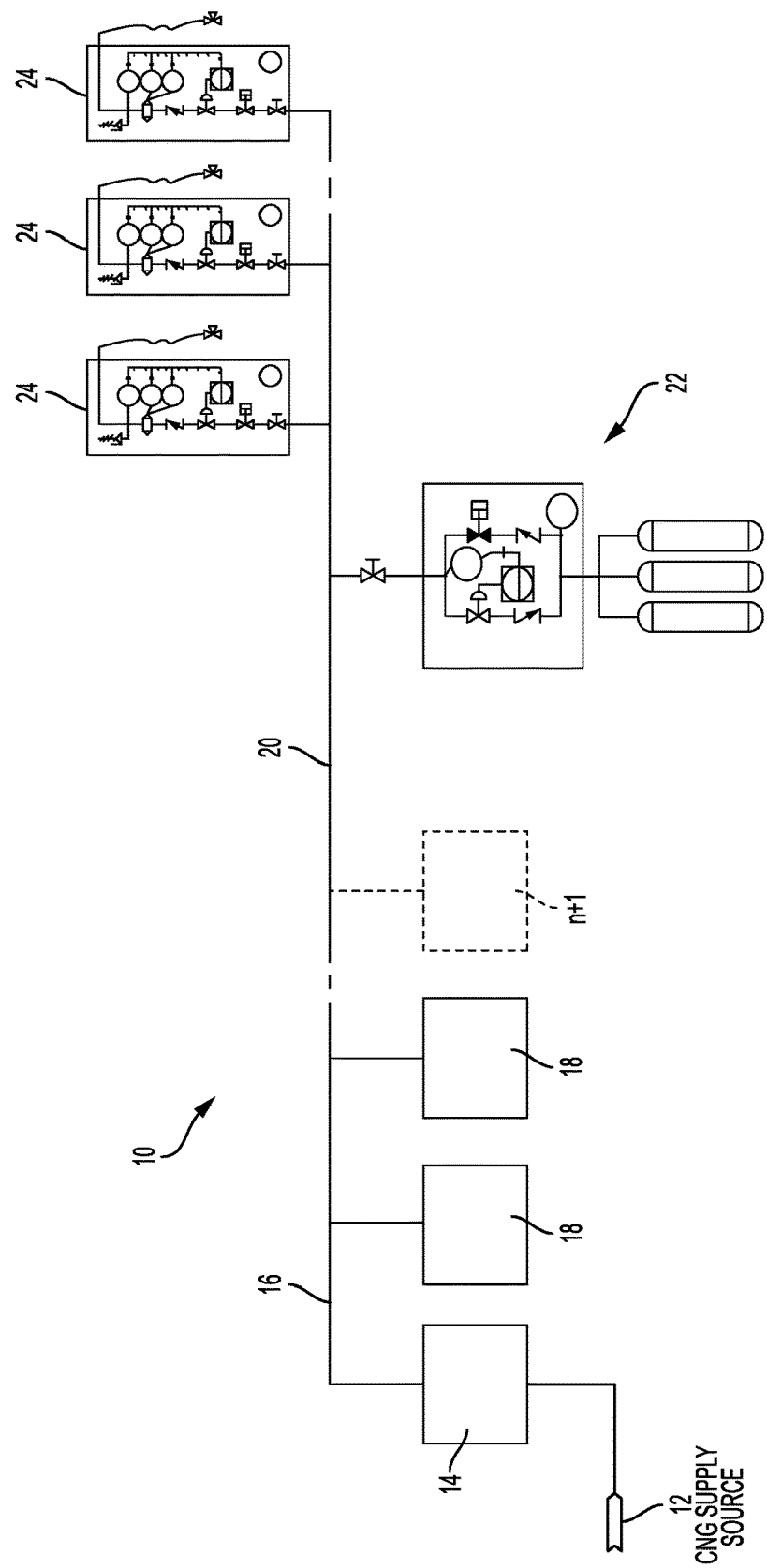
FIG. 3 is a schematic representation of a CNG dispensing system according to an embodiment of the present invention.
Figure 4:
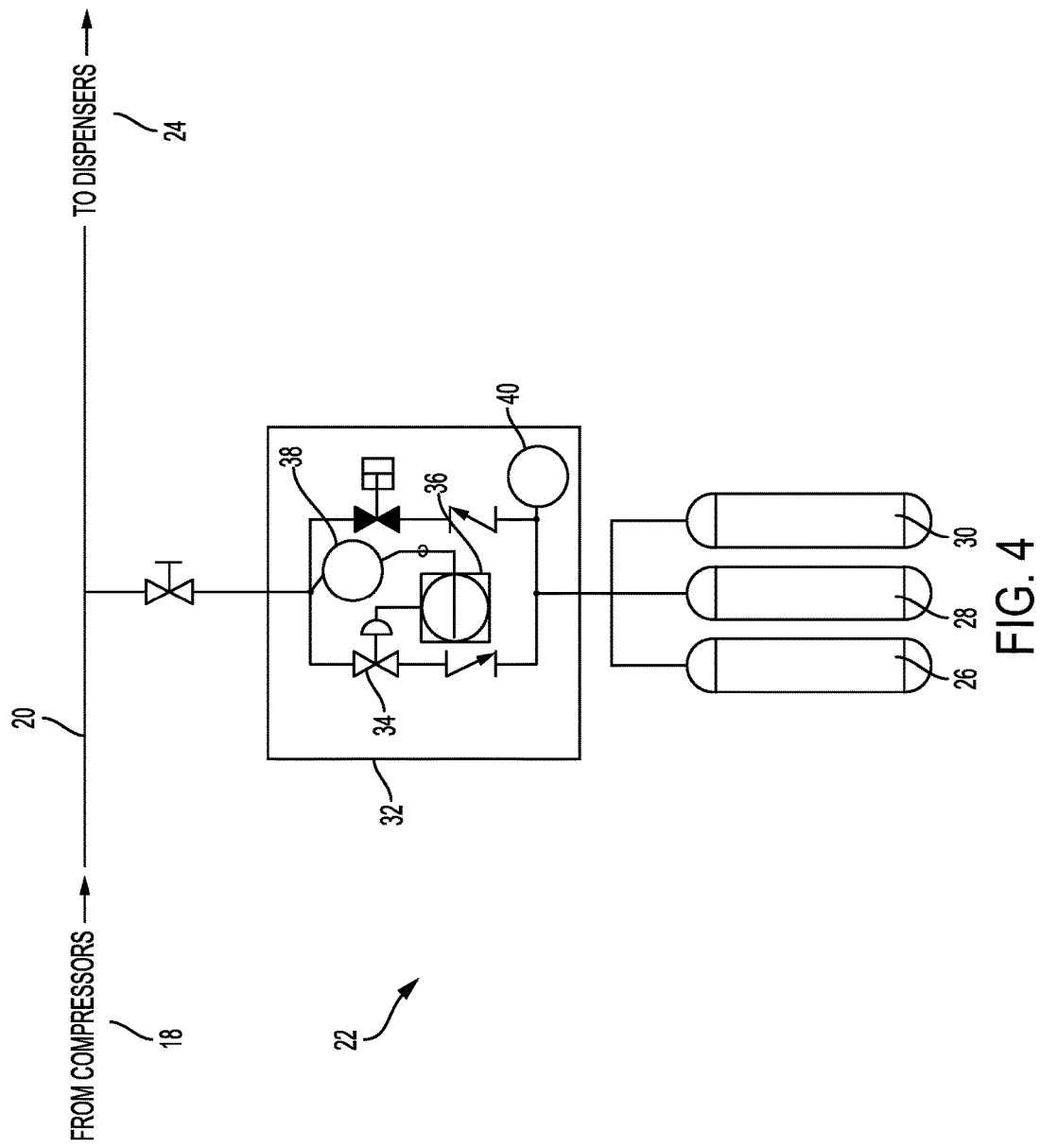
FIG. 4 is a schematic detail view of the storage system of the CNG dispensing system of FIG. 3.
Figure 5:
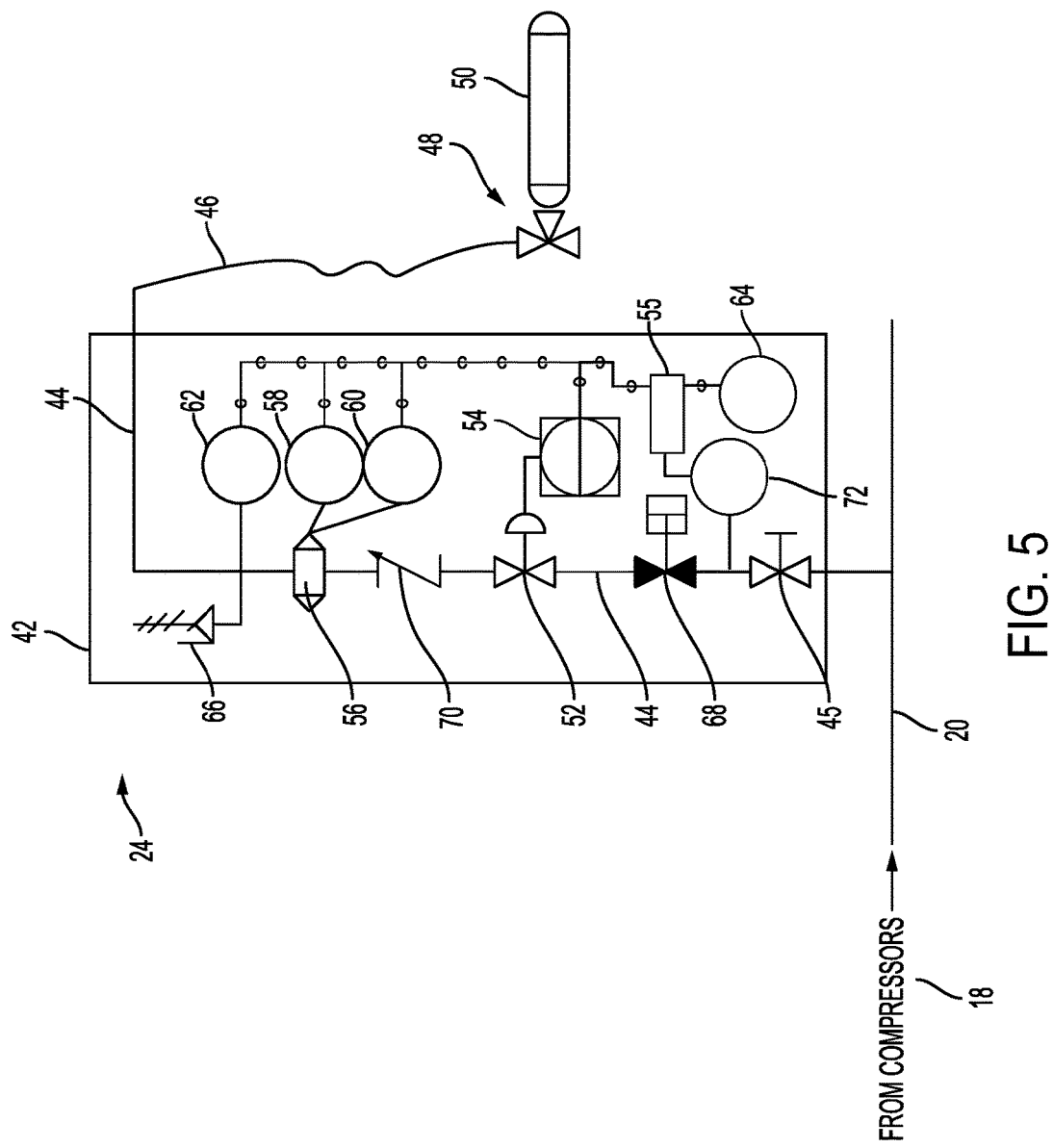
FIG. 5 is a schematic detail view of a CNG dispenser of the CNG dispensing system of FIG. 3.

Turning now to FIGS. 3-5, aspects of a CNG dispensing system in accordance with an embodiment of the present invention are described below. FIG. 3 is a schematic representation of a CNG dispensing system 10. First, a CNG supply source 12 is in fluid communication with a dryer 14. As those of skill in the art will appreciate, dryer 14 is preferably operative to remove water vapor from the CNG supply before it is stored or used. In one embodiment, dryer 14 may be analogous to the natural gas dryers offered by ANGI Energy Systems, Inc. of Janesville, Wis., the assignee of the present invention. In other embodiments, however, dryer 14 may be any suitable dryer technology familiar to those of skill in the art, including non-regenerating inlet dryers, regenerating inlet dryers, and twin-tower fully automatic regenerating dryers, among others.

CNG leaving dryer 14 may flow along a fluid conduit 16 to one or more compressors 18. In some embodiments, only a single compressor 18 may be provided, but in other embodiments multiple compressors 18 may be provided for additional capacity and/or redundancy, according to the needs of a particular dispensing system. Those of skill in the art can select suitable compressors 18 for use with embodiments of the present invention. In one embodiment, however, compressors 18 may preferably be analogous to the reciprocating compressors offered by ANGI Energy Systems. After compression, the CNG may be delivered to a storage system 22 and/or to one or more CNG dispensers 24, and ultimately to a storage vessel in a vehicle.

FIG. 4 is a schematic detail view of storage system 22. Those of skill in the art are familiar with storage systems for CNG dispensing applications and can select an appropriate storage system for use with embodiments of the present invention. Moreover, storage system 22 may not be provided in all embodiments. In one embodiment, however, storage system 22 may be analogous to the small or large vessel ASME storage systems offered by ANGI Energy Systems. As shown, storage system 22 may be a cascade storage system comprising low-, mid-, and high-bank storage vessels 26, 28, and 30 in operative fluid communication with a priority panel 32 that directs the CNG to storage system 22 or dispensers 24. A suitable gas management system may be used to prioritize delivery of CNG as is well known.

In general, priority panel 32 may comprise a valve 34 that is in fluid communication with supply plenum 20 and controlled by a valve controller 36. A first pressure transducer 38, which is in electronic communication with valve controller 36, is operative to measure the pressure upstream of the hose of fuel dispenser 24. Valve controller 36 may thus cause valve 34 to open and close based on feedback from pressure transducer 38. More particularly, valve controller 36 and valve 34 may function as a backpressure regulating system to keep a predetermined amount of gas flowing in supply plenum 20. Thus, valve controller 36 may cause valve 34 to open an amount based on the extent to which the discharge from compressors 18 exceeds the demand from dispensers 24. When there is no demand from dispensers 24, valve 34 may be completely opened to fill vessels 26, 28, 30. It will be appreciated that, in other embodiments, this function may be performed by a spring-loaded backpressure valve. In the illustrated embodiment, valve 34 may be sized for full turndown and to accommodate one half of the total flow rate from compressors 18 when fully opened. In this regard, valve 34 may preferably be appropriately sized for best back-pressure control and is able to turn down the flow with the most precise control. Pressure transducer 38 may be configured to measure pressures between 0 and 6000 psig. Depending on the demand from dispensers 34 and the stages of dispensing then ongoing, valve controller 36 may target pressures of between 4300 and 5000 psig at pressure transducer 38.

In some embodiments, a second pressure transducer 40 may be provided as redundant to transducer 38. In particular, in some embodiments, if readings are different between transducers 38, 40, a control algorithm may assume that one of the transducers is broken and give a fault notification. Pressure transducer 40 may also be used in lead/lag logic for controlling compressors 18, for example to control when compressors 18 should operate when there is no demand from dispensers 24.

FIG. 5 is a schematic detail view of a CNG dispenser 24 of CNG dispensing system 10. Certain components of dispenser 24, such as valves, pressure transducers, temperature indicators, mass flow meters, dispensing hoses, and nozzles, may preferably be analogous to corresponding components found in CNG dispensers familiar to those of skill in the art, including those offered by ANGI Energy Systems. Thus, a detailed description of these components is not provided herein, except where the components differ in accordance with embodiments of the present invention. In addition, as discussed in more detail below, in other embodiments certain components shown in FIG. 5 as located in dispenser 24 may instead be located elsewhere and associated with other CNG dispensing system components, such as compressors 18 or storage system 22, among others.

Dispenser 24 preferably comprises a housing 42 in which a gas conduit 44 extends. As shown, gas conduit 44 is in fluid communication with supply plenum 20 at one end and a pressure-tight dispensing hose 46 at the other. Gas flowing from supply plenum 20 may enter dispenser 24 via a gas inlet valve 45. Dispensing hose 46 may terminate in a conventional CNG refueling nozzle, such as an NGV type 1 or type 2 nozzle, which may have a three-way valve 48. The nozzle may interface with a conventional connector on a vehicle (not shown) to allow fluid communication between gas conduit 44 and a storage vessel 50 of the vehicle.

In addition, dispenser 24 may comprise a proportional control valve 52 disposed along gas conduit 44. Control valve 52, which may be a rising stem valve in some embodiments, is preferably under the control of a controller 54, which in various embodiments may be located internal to or external of dispenser 24. Controller 54 may be a driver or actuator for valve 52, and controller 54 is preferably in operative electronic communication with a control system 55. Control system 55, which may also be located within or external of dispenser 24 in various embodiments, may be any suitable electronics with associated memory and software programs running thereon whether referred to as a processor, microprocessor, controller, microcontroller, or the like. In one embodiment, however, control system 55 is preferably comparable to the microprocessor-based control systems for CNG dispensers offered by ANGI Energy Systems, but modified in accordance with the present invention. The memory of control system 55 may be any suitable memory or computer-readable medium as long as it is capable of being accessed by the controller, including random access memory (RAM), read-only memory (ROM), erasable programmable ROM (EPROM), or electrically EPROM (EEPROM), CD-ROM, DVD, or other optical disk storage, solid-state drive (SSD), magnetic disc storage, including floppy or hard drives, any type of suitable non-volatile memories, such as secure digital (SD), flash memory, memory stick, or any other medium that may be used to carry or store computer program code in the form of computer-executable programs, instructions, or data. Control system 55 may also include a portion of memory accessible only to control system 55. Control system 55 preferably stores computer-executable instructions which may cause control system 55 to carry out the steps of a method of filling a storage vessel with a fuel gas described below.

In accordance with embodiments of the present invention, controller 54 is preferably operative to actuate valve 52 to modulate the temperature of CNG flowing in gas conduit 44 and to control the pressure of CNG downstream of valve 52, depending on the mode of operation of dispenser 24. Controller 54 and control system 55 are preferably in electronic communication with a mass flow meter 56, which may output to control system 55 information representative of the mass flow rate 58 and the temperature 60 of CNG being dispensed. In some embodiments, flow meter 56 may be a Coriolis mass flow meter, analogous to the mass flow meters offered by ANGI Energy Systems with CNG dispensers. Control system 55 is preferably operative to determine the mass and volume of CNG dispensed based on flow rate information received from flow meter 56.

Dispenser 24 may also comprise a pressure transducer 62 in electronic communication with controller 54 and control system 55 that is operative to measure the pressure in conduit 44 and hose 46 downstream of mass flow meter 56. Further, dispenser 24 may comprise a temperature sensor 64, also in electronic communication with control system 55, that is operative to measure the ambient temperature. Pressure transducer 62 and temperature sensor 64 may respectively transmit information representative of their measured pressures and temperatures to control system 55, which may use this information in control decisions as described in more detail below. As those of skill in the art will appreciate, control system 55 may also be in electronic communication with other fuel dispensing equipment and components, such as solenoid valves associated with low-, mid-, and hi-bank storage vessels 26, 28, and 30.

Dispenser 24 may additionally comprise a safety relief valve 66 in fluid communication with conduit 44. Relief valve 66 is preferably operative to relieve excessive backpressure in conduit 44 and may, for example, be configured to open at pressures at or exceeding 4500 psig in some embodiments. A fast-acting, positive shutoff valve 68 and a one-way check valve 70 may be disposed along conduit 44 as shown. Finally, in some embodiments, an additional temperature sensor 72 may be disposed along conduit 44 upstream of control valve 52 (either upstream or downstream of shutoff valve 68) and operative to measure the temperature of fuel gas in conduit 44. Information from temperature sensor 72, which is in electronic communication with control system 55, may allow control system 55 to better predict the temperature of gas in conduit 44 downstream of valve 52 and enable control system 55 to make more precise adjustments to valve 52 in order to deliver the required pressure and temperature of gas in conduit 44 downstream of valve 52.

In various embodiments, system 10 described above may be used to dispense CNG to a vehicle and completely fill the vehicle's storage vessel, regardless of ambient temperature or initial vessel pressure. In general, embodiments of the present invention may comprise a multi-stage dispensing process. In a first stage, the process comprises obtaining information about (or "characterizing") a vehicle that is to be refueled at a dispenser 24. This stage may include determining the mass of CNG already in the storage vessel and determining the filling resistance. A second stage of the process comprises prescribing a "fueling profile," including target values for fueling, and then dispensing CNG in accordance with the fueling profile. Depending on the fueling profile prescribed, this second stage may involve filling the storage vessel with a predetermined amount of CNG that has been cooled in accordance with the fueling profile. In preferred embodiments, a control valve within the dispenser is used to reduce the temperature of the CNG prior to the CNG being introduced into the storage vessel. In a third stage, the process may complete filling of the storage vessel at the highest flow rate possible that does not cause the pressure of the CNG in the fuel dispensing hose or in the storage vessel to exceed a predetermined limit. This stage may involve filling without regard to the temperature of the dispensed CNG. As described below, the process may vary depending on the fueling profile prescribed, and the process may include fewer or more steps in some embodiments.

Figure 6:
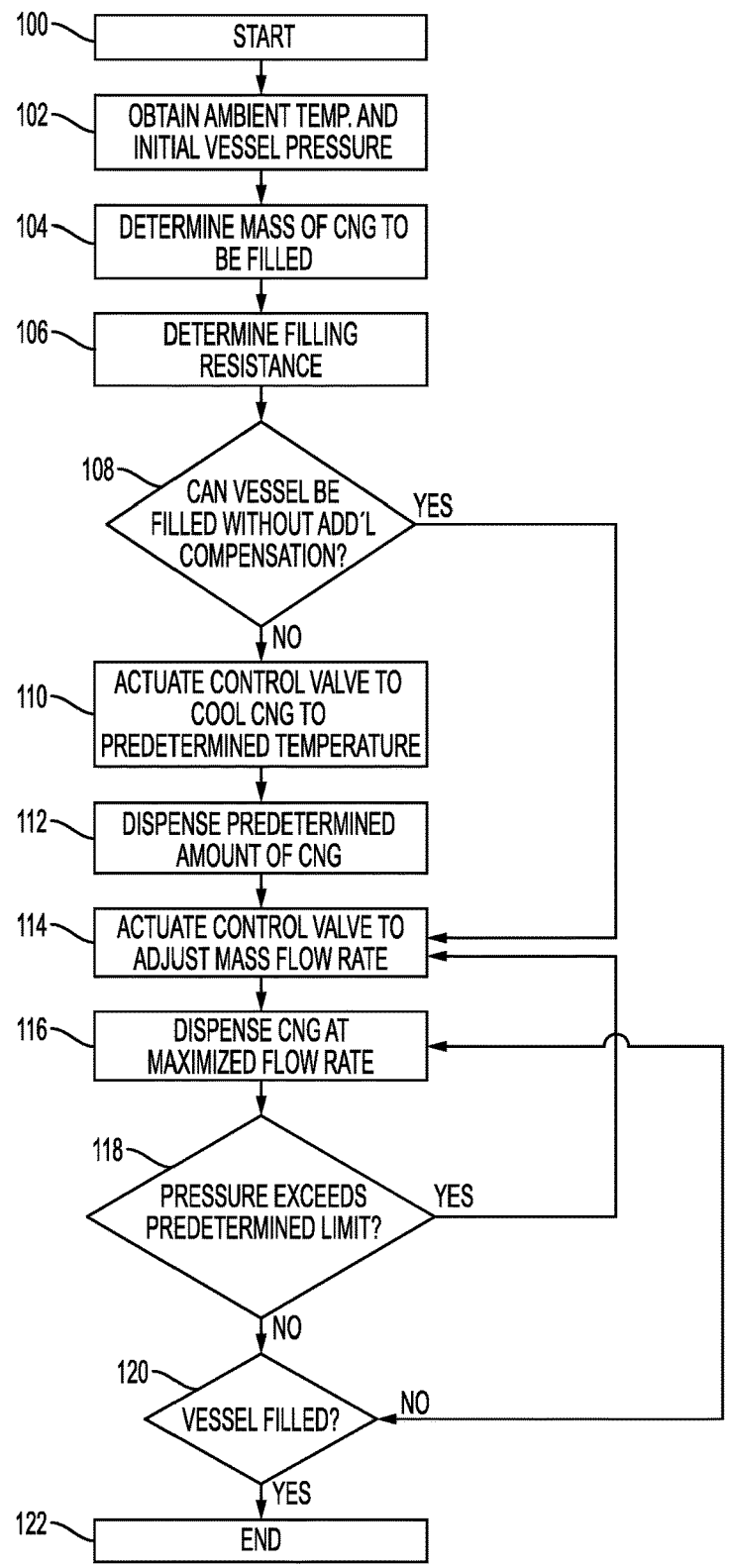
FIG. 6 is a flowchart illustrating steps of a method of filling a storage vessel with a fuel gas according to one embodiment of the present invention.

In this regard, FIG. 6 is a flowchart illustrating steps of a method of filling a storage vessel with a fuel gas according to one embodiment of the present invention. FIG. 6 is explained in detail below as used with system 10 described in FIGS. 3-5 above, and thus in the embodiment illustrated in FIG. 6, the fuel gas is CNG. As explained above, however, those of skill in the art will appreciate that the method may be used with any compressible fluid medium having a gaseous end-state. Additionally, those of skill in the art will appreciate that, in various embodiments, some steps of the method may be executed in a different order than the order described below without sacrificing benefits of the present invention.

At step 100, the process starts. At this point, a user may have initiated a fueling transaction. For example, the user may have connected a nozzle of a fuel dispenser 24 with a vehicle storage vessel and started the dispensing process, for example by obtaining authorization for a transaction and pressing a "start" button on the dispenser. As those of skill in the art will appreciate, if dispenser 24 is equipped to dispense fuel to more than one size of storage vessel, control system 55 may calculate the unfilled capacity of the storage vessel based on the particular nozzle the user connects to his or her vehicle.

At step 102, control system 55 may obtain the ambient temperature and the initial (static) storage vessel pressure ("static pressure"). For example, control system 55 may receive information representative of the ambient temperature from temperature indicator 64. Further, control system 55 may receive information representative of the pressure at pressure transducer 62. Assuming that the hose is pressurized from a previous fill and that the hose pressure has equalized with the pressure inside the storage vessel, the pressure at pressure transducer 62 may be assumed to be the initial pressure inside the storage vessel. It will be appreciated that, in some embodiments, it may be necessary to re-pressurize the hose and allow the flow and pressure to settle before determining the initial storage vessel pressure. The values of the ambient temperature and initial storage vessel pressure may be stored in memory accessible to control system 55.

Control system 55 may then determine the mass of CNG that is needed to completely fill the vehicle storage vessel (step 104). Those of skill in the art are familiar with methods for making this determination, and any such method may be used in embodiments of the present invention. For example, one such method is disclosed in the above-mentioned U.S. Pat. No. 5,653,269.

In general, control system 55 may determine the needed mass of CNG by first calculating the volume of storage vessel 50. Control system 55 may open the appropriate valve (e.g., a solenoid valve associated with low bank storage vessel 26 in storage system 22) to allow a predetermined mass of CNG to be dispensed into storage vessel 50. Control system 55 may then close the valve and obtain the pressure measured at pressure transducer 62, which will have risen from its previous value. The change in pressure between the initial pressure and the pressure measured after a known mass of CNG has been dispensed may then be used to determine the volume of the vehicle tank using the Ideal Gas Law, as is known.

Next, control system 55 may use the initial pressure of storage vessel 50 and the ambient temperature (both determined above) to calculate the temperature-compensated full tank pressure, for example with reference to supercompressibility data stored in memory, as is also known. In some embodiments, an empirical factor to compensate for compression heating may be multiplied to the full tank pressure value, though this is not required. In any event, the full tank pressure may be calculated in a manner similar to that by which prior art dispensers calculate the cutoff pressure expected to correspond to a completely full storage vessel 50. Control system 55 may then use the values of the above-calculated volume of vessel 50 and cutoff pressure as inputs into the Ideal Gas Law, solved for mass, to determine the mass of CNG needed to fill vessel 50.

At step 106, control system 55 may determine the filling resistance. The filling resistance is representative of the hydraulic pressure losses in the filling circuit, which as noted above may reduce the pressure obtainable at dispenser 24. The filling resistance also makes it difficult for dispenser 24 to dynamically sense or estimate the pressure in vessel 50 during the fill cycle. As a result of this resistance, for example, the pressure within the fuel dispensing hose may be dynamically much greater than the actual (dynamic) pressure within vessel 50.

To determine the filling resistance in one embodiment, control system 55 may open the appropriate valve (e.g., a solenoid valve associated with low-bank storage vessel 26) to allow CNG to be dispensed. When the flow rate of CNG has peaked and is steady, control system 55 may record the maximum flow rate and the pressure at pressure transducer 62 ("dynamic pressure"). Control system 55 may cause the valve to close after recording these measurements. Also, after closing the valve, control system 55 may again sample the pressure at pressure transducer 62 to obtain the pressure in storage vessel 50.

For subsonic flow conditions at the nozzle, the filling resistance may be calculated as follows: Filling resistance= (dynamic pressure−static pressure)/maximum flowrate$^2$. Therefore, control system 55 may estimate the pressure inside storage vessel 50 throughout the filling process by rearranging the previous equation as follows: static pressure=dynamic pressure−filling resistance*maximum flowrate$^2$.

In some embodiments, based on the above measurements and calculations, control system 55 may prescribe a fueling profile for the vehicle storage vessel. The fueling profile may indicate, for example, the type of compensation for ambient temperature and/or compression heating to be applied during dispensing. For example, control system 55 may evaluate one or more of the ambient temperature, the initial pressure of storage vessel 50, the full tank pressure, and/or the filling resistance to determine whether storage vessel 50 can be completely filled without additional compensation for the heat of compression (step 108). In other words, depending on some or all of these factors, control system 55 may determine that standard temperature-compensation methods may be adequate to provide a complete fill of storage vessel 50. This may be the case where, for example, the ambient temperature is below a predetermined temperature and the initial pressure of vessel 50 is above a predetermined pressure. In some embodiments, control system 55 may access a lookup table in memory comprising ambient temperatures, initial pressures, and/or other conditions for which complete filling is possible with only temperature compensation. If it is determined that a complete fill is possible without additional compensation, as shown in FIG. 6, the process proceeds to step 114, described below.

If, however, control system 55 determines that standard temperature compensation methods are inadequate to provide a complete fill, the fueling profile may indicate that additional compensation is necessary. In this case, system 10 is preferably operative to compensate for compression heating by dispensing a predetermined amount of cooled CNG into vessel 50. Thus, control system 55 may actuate control valve 52 to cool the CNG to a predetermined temperature (step 110) and may cause dispensing of a predetermined amount of CNG at that temperature (step 112). As described below, in various embodiments, the predetermined temperature and/or the predetermined mass may be calculated based on previous measurements (e.g., of ambient temperature and initial vessel pressure) and specified in the fueling profile.

More particularly, based on the Ideal Gas Law, gas moving from a higher pressure to a lower pressure will have a reduction in temperature. Thus, in embodiments of the present invention, cooling of the CNG may be achieved by controller 54 actuating control valve 52 such that a pressure differential is created across control valve 52 that is sufficient to cause the desired cooling. In one exemplary embodiment, the pressure upstream of valve 52 may be 5000 psig, and the valve 52 may be opened or closed to a position that causes the pressure downstream of valve 52 to be 1000 psig. In contrast to the prior art processes, wherein temperatures at the fuel dispenser nozzle could approach or exceed 120° F., during this stage temperatures at the nozzle may be approximately −20° F. in one embodiment. Control system 55 may then allow a continuous stream comprising a predetermined mass of CNG to be dispensed at that temperature, or it may dispense the predetermined mass in several (e.g., 3-7) small bursts. When the CNG enters vessel 50 it may cool further due to further expansion. In some embodiments, one or more intercooling devices may also be provided along conduit 44 and/or supply plenum 20, though this is not required in all embodiments.

The dispensed, cooled CNG will reduce the temperature inside vessel 50 during this stage of dispensing, and this reduction in temperature will compensate for increases in temperature of the gas inside vessel 50 due to the heat of compression when the remainder of the CNG is dispensed. As the temperature of the CNG in vessel 50 falls, so will its pressure. Thus, embodiments of the present invention can dispense the entire mass of CNG needed to fill storage vessel 50, regardless of ambient temperature or initial vessel pressure, without having to fill storage vessel 50 to a pressure higher than dispenser 24's cutoff pressure.

Those of skill in the art will appreciate that the temperature to which the CNG is cooled and the predetermined mass of cooled CNG dispensed may vary in embodiments of the present invention. In some embodiments, the fueling profile may comprise a particular mass of CNG to be dispensed at a preset, cooled temperature. In other embodiments, the fueling profile may also comprise the temperature to which the gas should be cooled. In some embodiments, for example, control system 55 may determine that it is necessary to create only a 500 psig pressure differential across control valve 52, rather than a 4000 psig differential noted above. The temperature to which the CNG is cooled and the mass dispensed at that temperature may vary depending on the ambient temperature, the initial pressure of vessel 50, the full tank pressure, and/or the filling resistance. Information output from mass flow meter 56 may be used to verify that the CNG has been cooled to the desired temperature and that the desired mass is dispensed. Those skilled in the art may determine by experimentation the temperatures to which the CNG should be cooled and the mass dispensed at the cooled temperature to provide the desired compensation for compression heating at various ambient temperatures and initial tank pressures. Further, the reduction in temperature achieved by the reduction in pressure may be determined by reference to the supercompressibility tables for the gas involved.

In compensating for the heat of compression, the predetermined mass of cooled CNG is dispensed with a pressure differential across control valve 52. Once this compensation has been performed, however, in embodiments of the invention the remaining mass of CNG needed to completely fill storage vessel 50 is dispensed at higher flow rates. The temperature of the CNG dispensed at these higher flow rates will likewise be higher, but compression heating caused by dispensing of the remainder of CNG is offset by the lower temperature of the predetermined mass of CNG dispensed in the steps described above.

As explained previously, if the mass flow rate of the CNG becomes too high, backpressures can develop upstream of the fueling nozzle and cause the dispenser to shutoff prematurely, for example by triggering safety relief valve 66. Thus, the higher flow rate is preferably selected (and, if necessary, iteratively adjusted) to provide the highest flow rate that does not cause the pressure measured at pressure transducer 62 to exceed a level that would cause dispenser 24 to shut off.

Accordingly, at step 114, the process comprises actuating control valve 52 to adjust the allowable mass flow rate of CNG. As explained above, the dynamic pressure measured at transducer 62 depends on the mass flow rate, and thus adjusting the mass flow rate via valve 52 also adjusts the pressure measured at transducer 62. (Also as noted above, if the additional compensation described above with reference to steps 110 & 112 is not required, the process may skip those steps and proceed with step 114.) At step 116, the remaining CNG needed to fill storage vessel 50 is dispensed.

More specifically, control system 55 may cause valve 52 to open an amount that allows a higher mass flow rate than the mass flow rate at the previous stage of dispensing. In some embodiments, adjustments to the position of valve 52 may be based on preset values stored in memory, and in other embodiments the adjustments may be calculated by control system 55 based on the mass of CNG needed to fill vessel 50, the initial pressure of vessel 50, and/or the filling resistance. Control system 55 may receive information regarding the mass flow rate 58 from mass flow meter 56, as noted above.

At step 118, control system 55 may determine whether the pressure measured at transducer 62 exceeds a predetermined limit. If so, the process returns to step 114, whereby control system 55 may iteratively adjust the position of valve 52 (and thus, the mass flow rate of CNG) based on feedback from pressure transducer 62 to maintain the pressure below the predetermined level. In some embodiments, the predetermined pressure level may also be a preset value stored in memory. In other embodiments, the predetermined pressure level may vary based on the mass of CNG needed to fill vessel 50, the initial pressure of vessel 50, the filling resistance, the settings of pressure relief valve 66, and/or other dispenser pressure limitations. In some embodiments, the predetermined pressure level may be specified in the fueling profile. In one embodiment, controller 52 may monitor the output of pressure transducer 62 to keep the pressure below about 4200-4300 psig, for example adjusting the position of valve 52 to reduce the mass flow rate if the pressure reaches or exceeds that value.

If the pressure measured at transducer 62 does not exceed the predetermined limit, the process proceeds to step 120. Here, control system 55 may determine whether vessel 50 has been completely filled. In one embodiment, control system 55 may determine whether vessel 50 has been completely filled based on information from mass flow meter 56 indicative of the mass of CNG that has been dispensed. In another embodiment, control system 55 may determine that vessel 50 has been filled based on information from pressure transducer 62 that the pressure has reached the temperature-compensated cutoff pressure, calculated above. If vessel 50 is not completely filled, the process may return to step 116. If vessel 50 is completely filled, the process ends (step 122).

Figure 7:
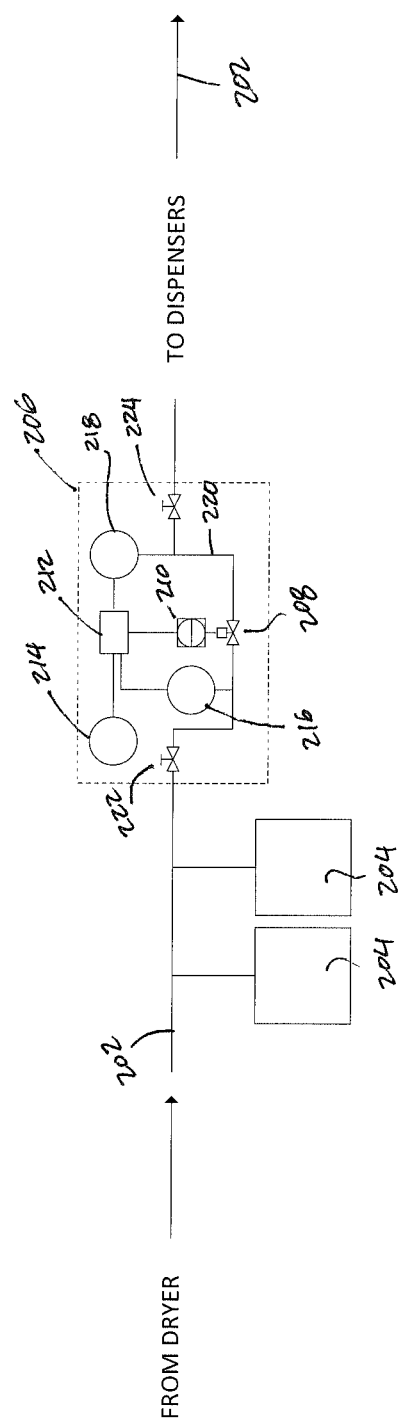
FIG. 7 is a schematic detail view of the compressor stage of a CNG dispensing system according to another embodiment of the present invention.

As noted above, in some embodiments certain components that may be used in the practice of embodiments of the present invention are not located within the housing a CNG dispenser, but rather are implemented another location within the CNG dispensing system. In this regard, FIG. 7 is a schematic detail view of a compressor stage 200 of a CNG dispensing system according to another embodiment of the present invention.

In particular, CNG leaving a dryer may flow along a fluid conduit 202 to one or more compressors 204. Compressors 204 may preferably be analogous to compressors 18, described above. After compression in this embodiment, however, rather than being delivered directly to a storage system and/or to one or more CNG dispensers, the CNG may first be delivered via conduit 202 to a temperature modulation stage 206. At temperature modulation stage 206, the temperature and pressure of the CNG flowing in conduit 202 may be modulated as described above with reference to FIGS. 5 and 6.

For example, in one embodiment, temperature modulation stage 206 may comprise a control valve 208 in operative electronic communication with a controller 210. Valve 208 and controller 210 are preferably analogous to valve 52 and controller 54 described above. Controller 210 is preferably in operative electronic communication with a control system 212, which may be analogous to control system 55, and control system 212 may also be in operative electronic communication with a temperature sensor 214 used to measure the ambient temperature at the temperature modulation stage. In addition, control system 212 may be in operative electronic communication with one or more pressure transducers 216, 218, analogous to pressure transducer 62, which may be used to measure the pressure of the CNG upstream and downstream of valve 208. CNG may pass through the temperature modulation stage 206 along a gas conduit 220, entering and exiting via inlet and exit valves 222, 224, respectively.

Control system 212 may also preferably be in operative electronic communication with other CNG dispensing system components described above, including the components of one or more CNG dispensers and/or the components of a storage system. Those of skill in the art will appreciate that, in yet other embodiments, any one or more of the components in temperature modulation stage 206 may be disposed in various other locations in the CNG dispensing system. For instance, in some embodiments, temperature modulation stage 206 may comprise only valve 208 and controller 210, while the other components are disposed within a CNG dispenser housing or another suitable location.

The CNG dispensing system of which compressor stage 200 of FIG. 7 is a part preferably operates in a manner similar to that described above with respect to FIGS. 5-6. Thus, control system 212 may implement the method of filling a storage vessel described above, but at least the steps related to actuation of control valve 208 to modulate CNG temperature and pressure may be performed at the compressor stage, rather than internal to the CNG dispenser housing. In doing so, control system 212 may operate as the control system for a particular CNG dispenser or work in cooperation with a conventional CNG dispenser control system.

It can thus be seen that embodiments of the present invention provide novel systems and methods for filling a storage vessel with natural gas and/or other compressible fluid media. By employing a control valve to reduce the temperature of fuel gas dispensed into a storage vessel, embodiments of the present invention may compensate for the heat of compression that occurs during fuel gas dispensing processes. Embodiments of the present invention may thus enable complete filling of a vehicle storage vessel for fuel gas without regard to ambient temperature or initial storage vessel pressure or fill level. While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. A method of filling a storage vessel with a fuel gas in a fuel gas dispensing system, the fuel gas dispensing system comprising a fluid flow path operatively connected with a source of the fuel gas and configured for fluid communication with the storage vessel, the method comprising the steps of:
    actuating a controlled valve disposed along the fluid flow path to a first position;
    flowing the fuel gas through the controlled valve in the first position, wherein when the controlled valve is in the first position, the fuel gas has a first temperature upstream of the controlled valve, a second, lower temperature downstream of the controlled valve, and a first mass flow rate;
    dispensing a first mass of the fuel gas into the storage vessel when the controlled valve is in the first position;
    actuating the controlled valve to a second position;
    flowing the fuel gas through the controlled valve in the second position, wherein when the controlled valve is in the second position, the fuel gas has a second mass flow rate that is greater than the first mass flow rate;
    dispensing a second mass of the fuel gas into the storage vessel when the controlled valve is in the second position; and
    receiving information representative of fuel gas pressure from a pressure transducer disposed along the fluid flow path and information representative of fuel gas mass flow rate from a mass flow meter disposed along the fluid flow path.

2. The method of claim 1, wherein the fuel gas is compressed natural gas (CNG).

3. The method of claim 1, wherein the fuel gas is hydrogen.

4. The method of claim 1, further comprising the step of determining an unfilled capacity of the storage vessel.

5. The method of claim 1, further comprising the step of determining a filling resistance based on the information representative of fuel gas pressure and the information representative of fuel gas mass flow rate.

6. The method of claim 1, further comprising the step of determining whether the storage vessel can be completely filled without temperature compensation.

7. The method of claim 1, wherein the temperature of the fuel gas at the storage vessel is below about 0° F. when the controlled valve is in the first position.

8. A method of filling a storage vessel with a fuel gas in a fuel gas dispensing system, the fuel gas dispensing system comprising a fluid flow path operatively connected with a source of the fuel gas and configured for fluid communication with the storage vessel, the method comprising the steps of:
    actuating a controlled valve disposed along the fluid flow path to a first position;
    flowing the fuel gas through the controlled valve in the first position, wherein when the controlled valve is in the first position, the fuel gas has a first temperature upstream of the controlled valve, a second, lower temperature downstream of the controlled valve, and a first mass flow rate;
    dispensing a first mass of the fuel gas into the storage vessel when the controlled valve is in the first position;
    actuating the controlled valve to a second position;
    flowing the fuel gas through the controlled valve in the second position, wherein when the controlled valve is in the second position, the fuel gas has a second mass flow rate that is greater than the first mass flow rate; and
    dispensing a second mass of the fuel gas into the storage vessel when the controlled valve is in the second position;
    wherein the first mass of dispensed fuel gas is dispensed in a plurality of bursts.

9. A method of filling a storage vessel with a fuel gas, the method comprising the steps of:
    flowing the fuel gas along a fluid conduit in fluid communication with the storage vessel;
    actuating a valve disposed along the fluid conduit to provide a predetermined difference between the pressure of the fuel gas upstream of the valve and the pressure of the fuel gas downstream of the control valve;
    the predetermined difference selected such that the temperature of the fuel gas is reduced to a predetermined temperature after passing through the valve;
    dispensing the fuel gas into the storage vessel, the fuel gas having a first mass flow rate;
    actuating the valve to allow dispensing of the fuel gas at a second mass flow rate that is higher than the first mass flow rate; and measuring the pressure of the fuel gas downstream of the valve using a pressure transducer.

10. The method of claim 9, wherein the second mass flow rate is selected such that the pressure measured at the pressure transducer does not exceed a predetermined level.

11. The method of claim 9, further comprising the step of adjusting the position of the valve based on feedback from the pressure transducer.

12. The method of claim 9, wherein a control system is in operative electronic communication with the valve.

13. The method of claim 9, wherein the predetermined difference is based in part on the ambient temperature at the storage vessel and the pressure of gas inside the vessel prior to filling.

14. The method of claim 9, wherein the predetermined difference is about 4000 psig.

15. A method of controlling dispensing of fuel gas into a storage vessel in a fuel gas dispensing system, the fuel gas dispensing system comprising a fluid flow path extending between a source of the fuel gas and the storage vessel, the method comprising the steps of:
receiving at a control system information representative of the ambient temperature at the storage vessel and information representative of the pressure of gas in the storage vessel;
determining an amount of fuel gas needed to completely fill the storage vessel;
enabling flow of the fuel gas along the fluid flow path;
actuating a controlled valve disposed along the fluid flow path to change the temperature of the fuel gas flowing in the fluid flow path;
dispensing a first amount of the fuel gas into the storage vessel, the first amount of fuel gas having a first temperature;
dispensing a second amount of the fuel gas into the storage vessel, the second amount of fuel gas having a second temperature that is higher than the first temperature; and
determining a temperature-compensated pressure corresponding to the pressure of gas in the storage vessel when it is completely filled.

16. The method of claim 15, wherein the control system is disposed within a housing of a fuel gas dispenser.

17. The method of claim 15, wherein the control system is disposed at a compressor stage of the fuel gas dispensing system.

18. The method of claim 15, wherein the first amount of fuel gas has a first mass flow rate and the second amount of fuel gas has a second mass flow rate that is higher than the first mass flow rate.

* * * * *